United States Patent
Kubota

(10) Patent No.: US 7,482,949 B2
(45) Date of Patent: Jan. 27, 2009

(54) PARKING ASSIST METHOD AND A PARKING ASSIST APPARATUS

(75) Inventor: Tomoki Kubota, Okazaki (JP)

(73) Assignee: Aisin AW Co., Ltd. (JP)

( * ) Notice: Subject to any disclaimer, the term of this patent is extended or adjusted under 35 U.S.C. 154(b) by 285 days.

(21) Appl. No.: 11/588,359

(22) Filed: Oct. 27, 2006

(65) Prior Publication Data
US 2007/0097209 A1 May 3, 2007

(30) Foreign Application Priority Data
Oct. 27, 2005 (JP) ............................. 2005-312939

(51) Int. Cl.
B60Q 1/48 (2006.01)
(52) U.S. Cl. .................... 340/932.2; 340/937; 340/903; 348/118; 348/148; 382/104
(58) Field of Classification Search ............. 340/932.2, 340/937, 903, 435, 990, 992, 995.1, 995.12, 340/988; 348/118, 148, 149; 382/106, 104; 361/1
See application file for complete search history.

(56) References Cited

U.S. PATENT DOCUMENTS

| 6,369,701 | B1 * | 4/2002 | Yoshida et al. ............. 340/435 |
| 6,483,429 | B1 * | 11/2002 | Yasui et al. ................. 340/435 |
| 7,069,128 | B2 * | 6/2006 | Iwama .......................... 701/36 |
| 7,336,805 | B2 * | 2/2008 | Gehring et al. ............. 382/104 |
| 2002/0005779 | A1 | 1/2002 | Ishii et al. ................... 340/436 |
| 2005/0043871 | A1 | 2/2005 | Endo ............................ 701/36 |

FOREIGN PATENT DOCUMENTS

| EP | 1400410 | 3/2004 |
| JP | 2002-354467 | 5/1998 |

* cited by examiner

Primary Examiner—Anh V La
(74) Attorney, Agent, or Firm—Bacon & Thomas, PLLC

(57) ABSTRACT

A parking assist apparatus includes a CPU for generating recorded image data based on image data obtained from a camera which is mounted on a vehicle, the image data being related to at least an imaging position, and an image memory for retaining the recorded image data even after the parking operation is terminated. The parking assist apparatus also includes an image processor for outputting a parking assist image using the recorded image data and current image data on a display and an RAM for storing ending history data which is obtained when the parking operation is terminated. When the parking operation is terminated once and then repeated, the CPU and the image processor determine whether the recorded image data stored before the termination of the prior parking operation is still useful, on the basis of the ending history data.

11 Claims, 10 Drawing Sheets

PARKING ASSIST METHOD AND A PARKING ASSIST APPARATUS

INCORPORATION BY REFERENCE

The disclosure of Japanese Patent Application No. 2005-312939 filed on Oct. 27, 2005, including the specification, drawings and abstract thereof, is incorporated herein by reference in its entirety.

BACKGROUND OF THE INVENTION

1. Field of the Invention

The present invention relates to a parking assist method and a parking assist apparatus.

2. Description of the Related Art

A known parking assist apparatus obtains image data through an on-board (in-vehicle) camera which is attached to the rear of a vehicle and outputs the image data as a screen on a monitor display mounted near the driver's seat. Although the on-board camera typically provides images of the area behind the rear bumper of the vehicle, the area beneath the body of the vehicle and the area around the rear corners of the vehicle are outside the field of view of the on-board camera. Therefore, the further the vehicle enters a parking space, the less a landmark, such as a white line marking the parking space, remains within the viewing area of the on-board camera, so that it becomes difficult for a driver to park the vehicle because the driver cannot determine the position of the vehicle relative to the parking space or the position of a wheel stop in the monitor display.

To resolve such a problem, an apparatus disclosed in Japanese Unexamined Patent Application Publication No. 2002-354467 stores image data obtained by the on-board camera in a memory and displays a composite of image data made up of stored past image data and current image data. Such an apparatus reads out image data for an area hidden as a blind spot of the on-board camera and outputs a composite image using the read out image data.

However, in the apparatus described above, image data stored in the memory is deleted when the shift position of the vehicle is changed to a position other than "reverse" or when the ignition system is turned off. Thus, even if a driver wants to repeat a parking operation because the vehicle is improperly positioned within a parking space or because the vehicle and a neighboring parked vehicle are too close, in some cases the image data is no longer available in the memory, and thus a composite image cannot be displayed when repeating the parking operation.

SUMMARY OF THE INVENTION

Accordingly, it is an object of the present invention to provide a parking assist method and a parking assist apparatus for displaying a parking assist image during repeating of a parking operation.

To achieve the foregoing object, the present invention provides a parking assist method for assisting a parking operation of a vehicle, comprising the steps of: storing image data obtained from an imaging device mounted on the vehicle as recorded image data in an image data storage device during and after termination of the parking operation; storing history data of the parking operation in a history data storage device; determining whether or not the recorded image data stored before the termination of the parking operation is useful on the basis of the history data when the parking operation is repeated after the parking operation is terminated once; and outputting, responsive to a determination that the recorded image data is useful, a parking assist image using the recorded image data and current image data on a display device.

The present invention also provides a parking assist apparatus mounted in a vehicle comprising an image obtaining device for obtaining image data from an imaging device mounted on the vehicle, an image data storage device for storing the obtained image data as recorded image data, display control means for outputting a parking assist image using the recorded image data and current image data on a display device, a history data storage device for storing history data from a prior parking operation, and determining means for determining, when a parking operation is repeated after the parking operation is terminated once, whether or not the recorded image data stored before the termination of the parking operation is useful. The determination is made based on the history data. The display control means device, responsive to a determination that the recorded image data stored before the termination of the parking operation is useful, outputs a parking assist image using the recorded image data and the current image data on the display device.

The history data includes time data for the time when a parking operation was terminated, and the determining means determines, provided that the time when the parking operation was terminated is found to be within a predetermined time period on the basis of the time data and the time when the parking operation is repeated, that the recorded image data stored before the termination of the parking operation is useful.

The history data may include the image data obtained by the imaging device when the prior parking operation was terminated, and the determining means determines whether or not there is a change in the area around the vehicle by comparing the image data obtained when the prior parking operation was terminated to image data obtained when the parking operation is repeated, and when there is no change in the area around the vehicle, further determines that recorded image data stored before the termination of the prior parking operation is useful.

Alternatively, the history data and the recorded image data stored in the image data storage device during the parking operation may be one and the same, in which case the determining means determines that there is a change in the area around the vehicle by comparing the image data obtained at a given position when the parking operation is repeated with the recorded image data previously obtained at the same position in the prior parking operation and, when the image data is the same, further determines that the recorded image data stored before the termination of the prior parking operation is useful.

In another alternative, the history data may include the position of the vehicle when the prior parking operation was terminated, in which embodiment the determining means determines whether the position of the vehicle when the prior parking operation was terminated is identical to the position of the vehicle when the parking operation is to be repeated.

The parking assist apparatus may further include vehicle condition determining means for determining, when an off-signal is input from the ignition system of the vehicle, that the parking operation is terminated.

DESCRIPTION OF THE PREFERRED EMBODIMENTS

An embodiment of the present invention is described with reference to FIGS. 1 to 13 below.

Figure 1:
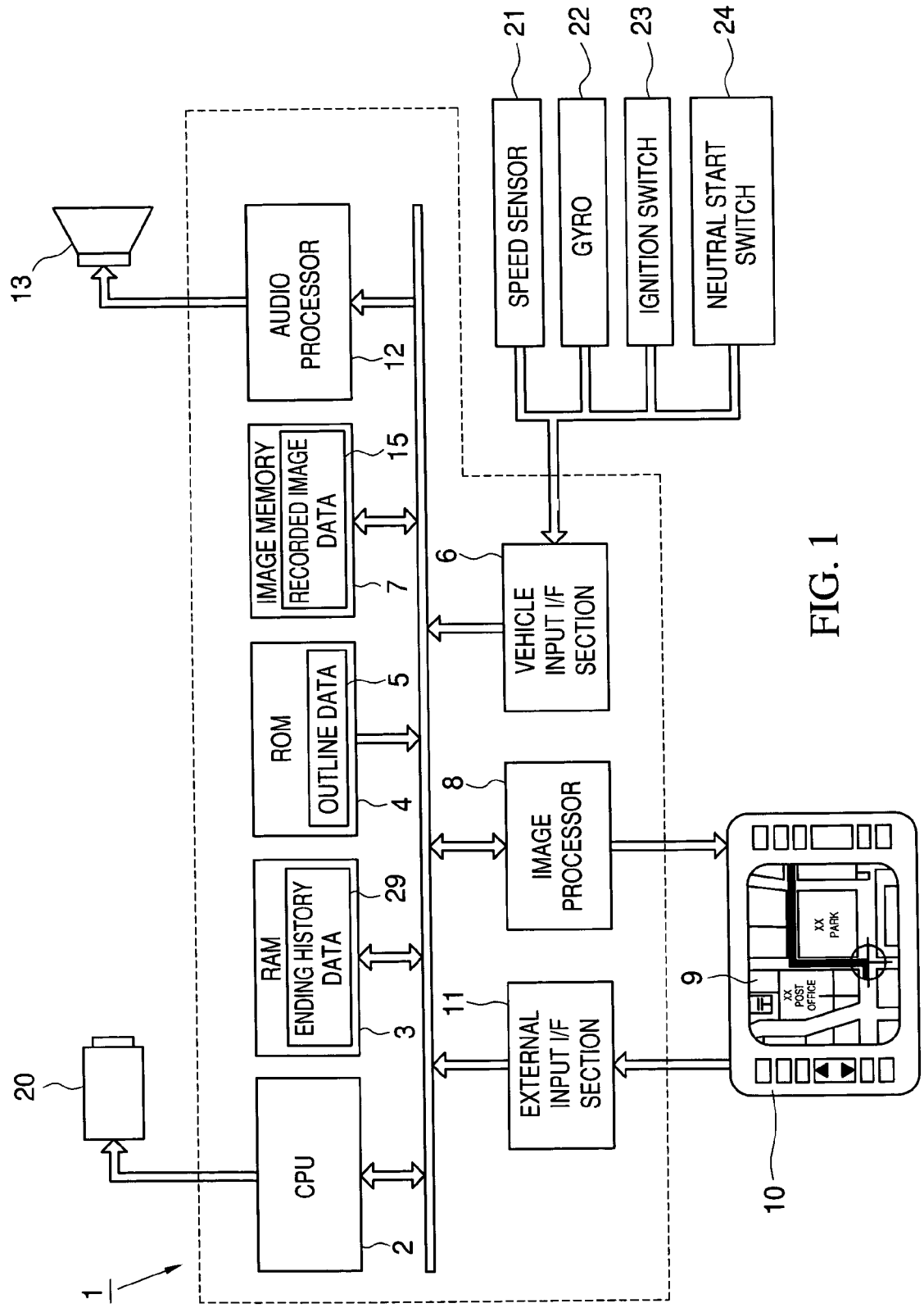
FIG. 1 is a block diagram of a parking assist apparatus according to an embodiment of the present invention.

As shown in FIG. 1, the parking assist apparatus is mounted in a vehicle C and includes a CPU 2 serving as image data receiving means, determining means, and as vehicle condition determining means. The parking assist apparatus further includes a RAM 3 as history data storage means such as a SRAM or a flash memory, and an ROM 4. The CPU 2 receives a speed pulse and a direction detection signal from a speed sensor 21 and a gyro 22, respectively, through a vehicle input I/F section 6. Further, the CPU 2 calculates relative coordinates of a reference position of the vehicle C based on the speed pulse and the direction detection signal.

The CPU 2 also receives as inputs on/off signals of an ignition system from an ignition switch 23, constituting the ignition system of the vehicle C, through the vehicle input I/F section 6. When the CPU 2 receives the on-signal from the ignition switch 23, the parking assist apparatus 1 is activated. When the CPU 2 receives the off-signal, the parking assist apparatus 1 switches from an operational mode to a standby mode and waits for the next on-signal from the ignition switch 23. Next, the CPU 2 receives a shift position signal, indicating the current shift position of the vehicle C, from a neutral start switch 24, through the vehicle input I/F section 6.

Figure 2:
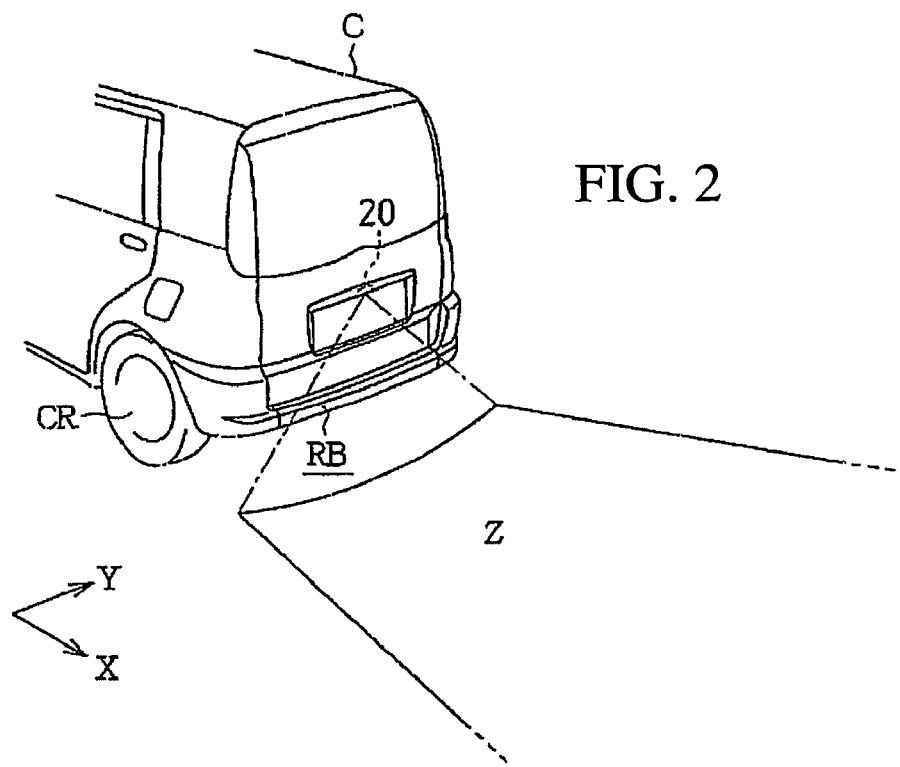
FIG. 2 is a diagram showing a camera location on a vehicle.
Figure 3A:
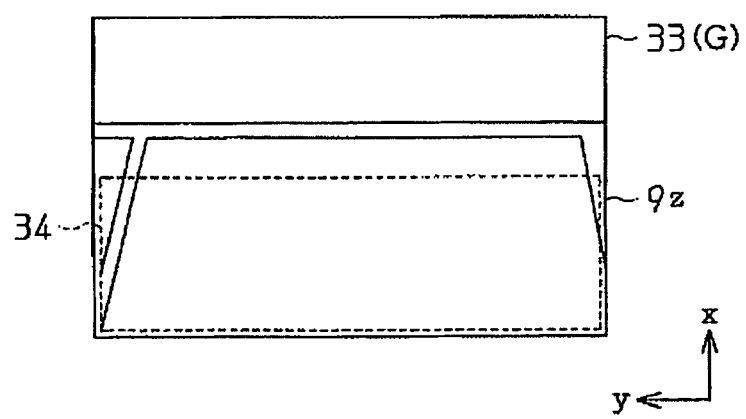
FIG. 3A illustrates image data and FIG. 3B illustrates recorded image data.
Figure 3B:
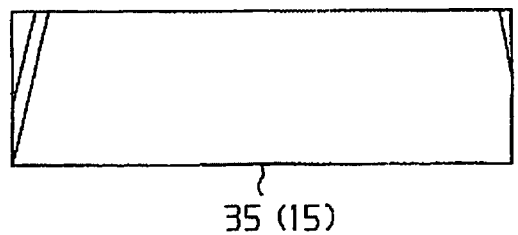

When the CPU 2 receives the on-signal from the ignition switch 23, the CPU 2 activates a camera 20 ("imaging device") mounted on the vehicle C. The CPU 2 then obtains image data G which contains the area behind the vehicle C at a predetermined timing. As shown in FIG. 2, the camera 20 is positioned roughly in the center of the rear of the vehicle (in x-axis and y-axis directions of the vehicle coordinate system) and the optical axis of the camera is vertically oriented. The camera 20 is a digital camera capable of taking color images and generating the image data G which undergoes analog/digital conversion. The digital camera may have optics (not shown) such as, for example, a wide-angle lens, a mirror, and so on, and a CCD image sensor (not shown). For example, the camera 20 may have a 140-degree-wide field of view and the viewing range Z of the camera 20 may extend about several meters to the rear. The camera field of view includes a portion of the rear bumper RB of the vehicle C.

The CPU 2 obtains the image data G by control of the camera 20 to capture data every time the vehicle C travels a predetermined increment of distance in reverse. Then the CPU 2 stores the image data G as recorded image data 15 in an image memory 7 which serves as the image data storage means. For example, when the CPU 2 obtains the image data G as shown in the image 33 of FIG. 3A, an image processor 8, serving as display control means and determining means, abstracts an abstract area 34 from the image data G and generates the recorded image data 15 for display of the image 35 shown in FIG. 3B. The abstract area 34 is the area indicated by the x-axis of the screen coordinates (x, y) corresponding to the direction in which the vehicle C travels in reverse and is located at the bottom of a display area 9z of a display 9, serving as a display means. Therefore, the recorded image data 15 includes the road surface near the rear of the vehicle C, i.e. the data includes white lines defining a parking space or a wheel stop at the rear of the parking space. Note that the actual image data G may be distorted due to lens aberration of the camera 20. However, such image distortion is omitted here for convenience.

After the recorded image data 15 is generated, the CPU 2 stores the recorded image data 15, position data 16 representing the position where the recorded image data 15 is obtained, and time data 17 representing the time when the recorded image data 15 is obtained, all correlated with each other in the image memory 7. Note that, even if the parking assist apparatus 1 enters the standby mode, the recorded image data 15 remains stored in the image memory 7 without being deleted.

Figure 4A:
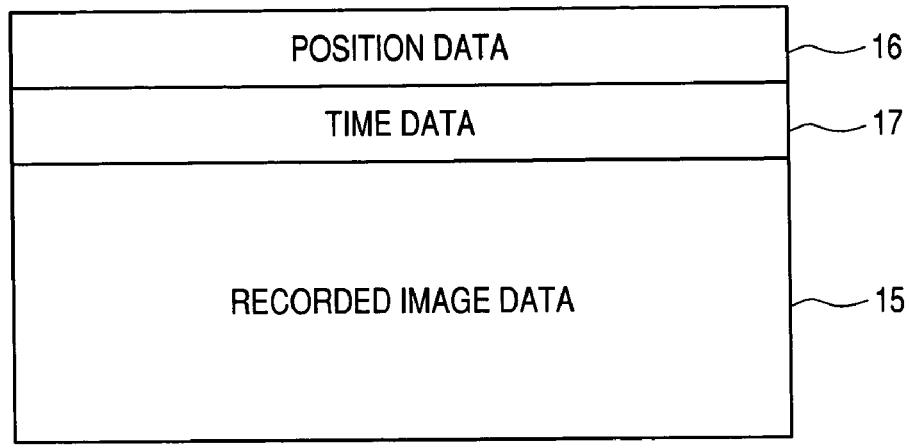
FIG. 4A is a diagram showing the structure of recorded image data and FIG. 4B is a diagram showing the structure of ending history data.
Figure 4B:
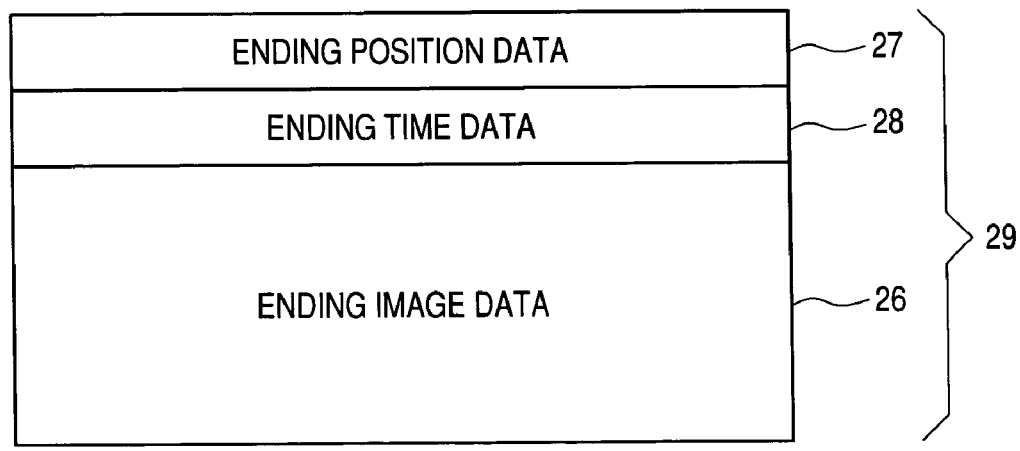
Figure 5A:
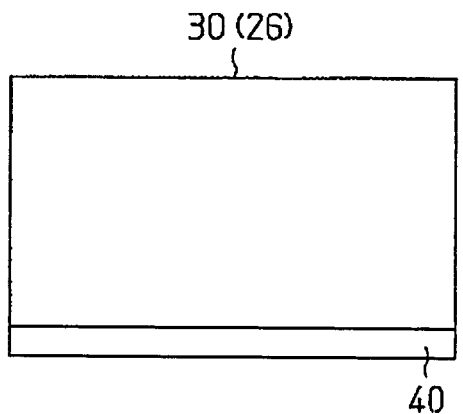
FIGS. 5A and 5B are diagrams illustrating determination of the identity of images when the vehicle reverses from a position where the most recent prior parking operation was terminated and FIGS. 5C and 5D are diagrams illustrating determination of the identity of images when the vehicle moves forward from the same position of the most recent prior parking operation.
Figure 5B:
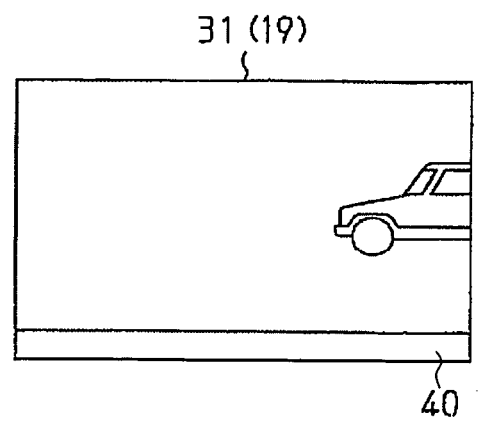
Figure 5C:
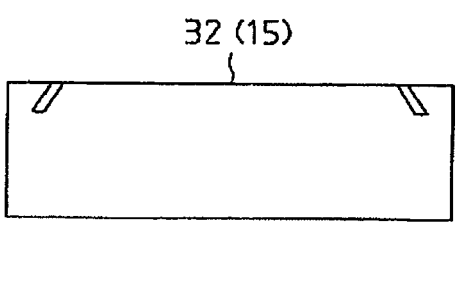
Figure 5D:
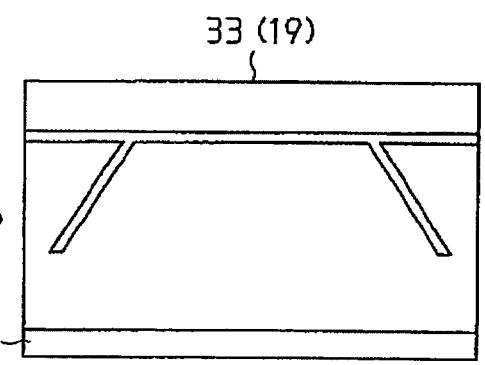
Figure 6:
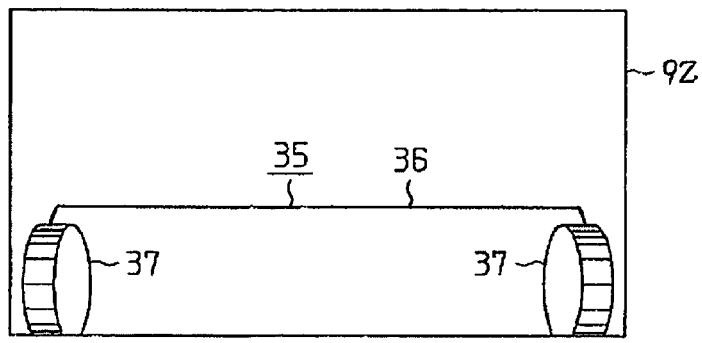
FIG. 6 is a diagram showing an additional line superimposed on a rear view image.

When the CPU 2 receives the off-signal from the ignition switch 23, the CPU 2 controls the camera 20 to obtain the image data G at that time. Then, as shown in FIG. 4B, the image data G is stored as ending image data 26 in the RAM 3 in correlation with ending position data 27 representing the final, parked position of the vehicle C and ending time data 28 based on an internal clock of the CPU 2. Even if the parking assist apparatus 1 enters the standby mode, the ending image data 26, the ending position data 27, and the ending time data 28 remain stored in the RAM 3 without being deleted. The ending image data 26, the ending position data 27, and the ending time data 28 stored in the RAM 3 when the off-signal is input from the ignition switch 23 are collectively termed here "ending history data 29".

When the ignition switch 23 inputs the on-signal, the CPU 2 determines whether or not a parking assist mode using the recorded image data 15 should be selected, on the basis of the ending history data 29 stored in the RAM 3. More specifically, the CPU 2 calculates the standby time from the ending time, when the parking operation was terminated, to the current time. The ending time is based on the ending time data 28 stored in the RAM 3 and the current time is based on the internal clock. Then the CPU 2 determines whether or not the standby time is 60 seconds or less.

The image processor 8 compares the ending image data 26 with image data G (hereinafter referred to as current image data 19) obtained when the on-signal is input by the ignition switch 23 and the shift position is switched to the "reverse" position. The CPU 2 first compares the ending position data 27 of the ending history data 29 and the current position of the vehicle C. When the ending position data 27 is identical to that for the current position, that means the vehicle C will start in reverse from that same position, that is, the parking operation is repeated from the same position. In this case, the image processor 8 generates, for example, difference data detailing the difference between the ending image data 26 of the image 30 in FIG. 5A and the current image data 19 of the image 31 in FIG. 5B. Then the image processor 8 detects the difference between the ending image data 26 and the current image data 19 by, for example, binarizing the difference data. For example, when a movable body enters the area behind the vehicle C or when the vehicle C is forced to move without starting the engine while the parking assist apparatus 1 is in the standby mode, the movable body is detected.

When the CPU 2 determines that the ending position data 27 representing the position where the last parking operation was terminated is not identical to the current position of the vehicle C, that means the vehicle C has been moved from the ending position and a parking operation is initiated from the new position. In this case, the image processor 8 searches for recorded image data 15 associated with position data 16 for the new current position of the vehicle C (the position from which the new parking operation is initiated). When the appropriate recorded image data 15 is found, it is read out from the image memory 7. As shown in the image 32 of FIG. 5C, the image processor 8 compares the read out recorded image data 15 with the current image data 19 such as in the image 33 of FIG. 5D. The read out recorded image data 15 is compared with the current image data 19 to calculate the difference in pixel density between the recorded image and the current image. Further, the position at which the difference in the number of pixels is minimum is found and the difference data for the difference between the recorded image data 15 and the current image data 19 is binarized, so that the difference is thereby detected.

The CPU 2 determines that the current mode should be changed to the parking assist mode using the recorded image data 15, provided that the standby time is within 60 seconds (60 seconds or less) and provided that there is a high level of similarity between the ending image data 26 (or the recorded image data 15) and the current image data 19.

When determining whether it is possible to switch to the parking assist mode, the CPU 2 controls the image processor 8 to read out the predetermined recorded image data 15 from the image memory 7. The CPU 2 then displays both an image which reveals the area hidden by the blind spot of the camera 20, based on the read out recorded image data 15, and an image which is based on the current image data 19.

As shown in FIG. 1, outline data 5 is stored in the ROM 4. The outline data 5 is data for drawing the outline of the vehicle C in which the parking assist apparatus 1 is installed, as shown in FIG. 2. When the outline data 5 is output on the display 9, an additional line 35 as an indicator is displayed in the display area 9z of the display 9. The additional line 35 may include an outline 36 of the rear of the vehicle and a wheel outline 37 indicating the position of each rear wheel CR (in FIG. 2).

Figure 8:
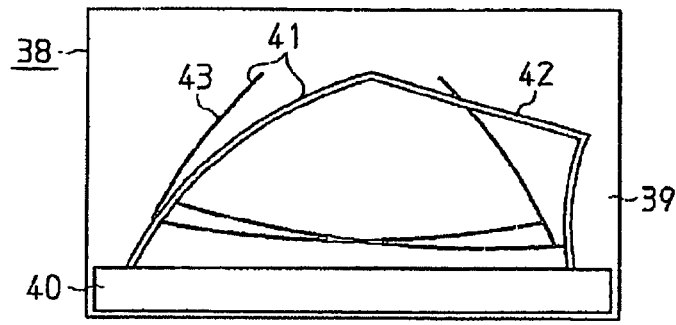
FIG. 8 is a diagram showing superimposed guidelines.

When the parking assist mode using the recorded image data 15 is not chosen, the CPU 2 controls the camera 20 to obtain the image data G at 30 frames per second and displays a rear monitor screen 38, shown in FIG. 8, through the image processor 8. In the rear monitor screen 38, an image of the area behind the vehicle C 39 and an image of the bumper 40, which includes the center point of the rear bumper RB of the vehicle C, are displayed. Further, a guideline 41 is superimposed on the image of the area behind the vehicle C 39. The guideline 41 may include a probable movement locus 42 drawn depending on the rudder angle of the vehicle C and an extended line 43 indicating the width of the vehicle C.

The display 9 connected to the parking assist apparatus 1 is a touch panel. When an input operation is performed on the touch panel, the CPU 2 receives a predetermined signal corresponding to the input operation through an external input I/F section 11. When an input operation is performed by manual operation of a switch 10 mounted next to the display 9, the CPU 2 also receives a predetermined signal corresponding to the input operation through the external input I/F section 11. The parking assist apparatus 1 may include an audio processor 12 which outputs an alarm and/or audio guidance from a speaker 13 connected to the parking assist apparatus 1.

Figure 9:
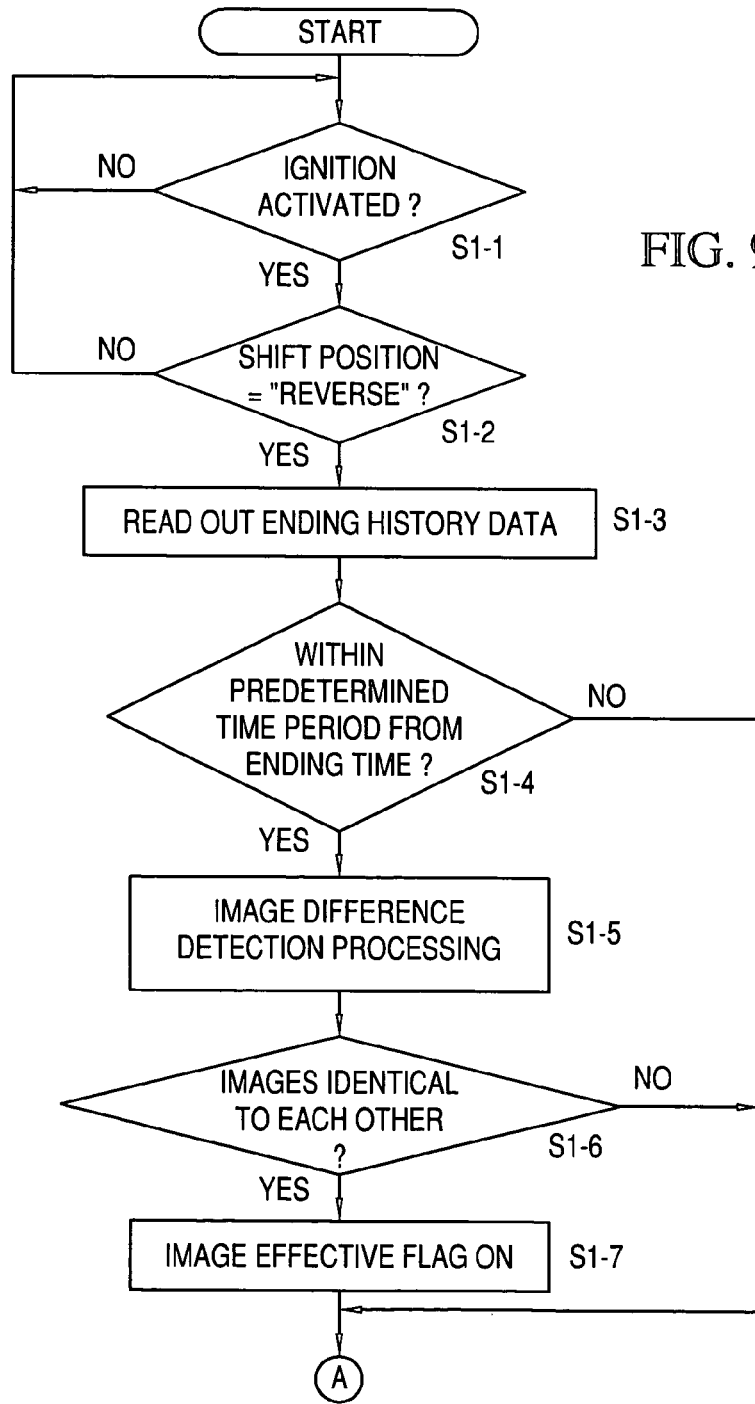
FIG. 9 is a flowchart of an embodiment of the method of the present invention.

Next, an embodiment of the method of the present invention, particularly suited for repeating a parking operation after the operation is once terminated, will be described. As shown in FIG. 9, the CPU 2 of the parking assist apparatus 1 waits for input of the on-signal from the ignition switch 23 and determines whether or not the ignition system is activated (Step S1-1). When the on-signal is input from the ignition switch 23 (Step S1-1=YES), the CPU 2 sets a bootable flag stored in the RAM 3 as "1" which means "on-state". Next, the CPU 2 determines whether or not the shift position of the current vehicle C is "reverse", on the basis of the shift position signal from the neutral start switch 24 (Step S1-2). If the shift position is other than "reverse" (Step S1-2=NO), the CPU 2 sets a value for the shift position SP as a variable stored in the RAM 3. If the shift position is "reverse" (Step S1-2=YES), the CPU 2 changes the shift position SP stored in the RAM 3 to "reverse", and reads out the ending history data 29 stored in the RAM 3 (Step S1-3). The ending history data 29 is data stored when the last off-signal was input from the ignition switch 23.

The CPU 2 then determines whether or not the standby time, from the point in time when the most recent parking operation was terminated to the current time, is within a predetermined time period, on the basis of the ending time data 28 in the ending history data 29 and the current time (Step S1-4). In the present embodiment, the predetermined time period is set as 60 seconds. If the last parking operation was performed several hours or several days before the current time, the standby time is longer than 60 seconds (Step S1-4=NO), and accordingly, the CPU 2 determines that the recorded image data 15 stored during the last parking operation should not be used, and the procedure goes to Step S2-1. In this case, the recorded image data 15, which is stored in the image memory 7 and determined to be useless, is deleted.

Figure 10:
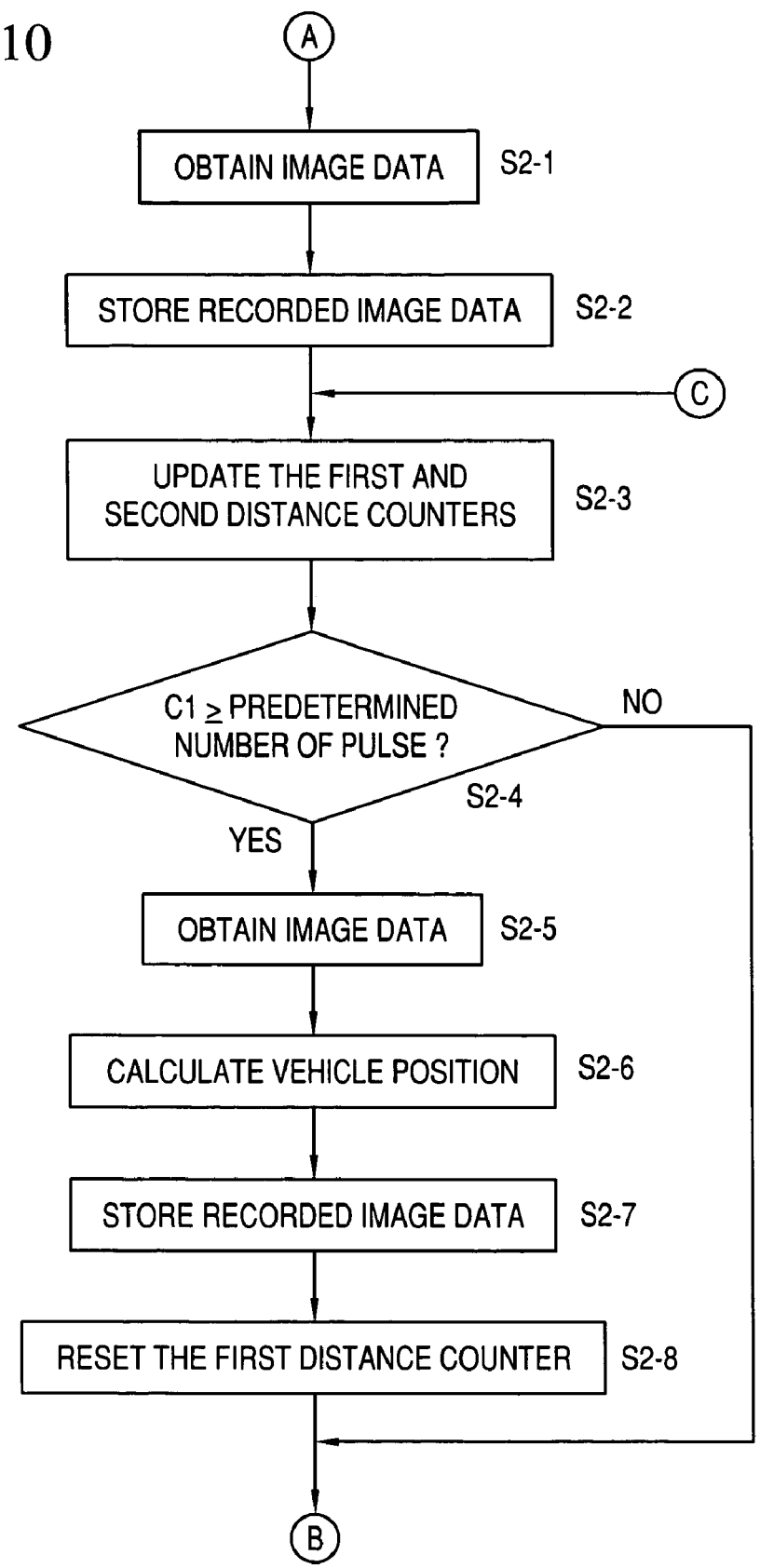
FIG. 10 is a continuation of the flowchart of FIG. 9.

As shown in FIG. 10, the CPU 2 next obtains the image data G from the camera 20 in Step S2-1. The CPU 2 controls the image processor 8, abstracts the abstract area 34 from the obtained image data G, generates the recorded image data 15, and stores the generated image data 15 in the image memory 7 as being related to the position data 16 representing the initial position and the time data 17 representing the current time (Step S2-2).

The CPU 2 updates the number of input pulses of first and second distance counters, which are variables stored in the RAM 3, on the basis of the number of the speed pulses input from the speed sensor 21 (Step S2-3). Note that, immediately after the ignition switch 23 is turned on, the accumulated numbers of pulses C1 and C2 as the values of the first and second distance counters are reset to an initial value "0". The CPU 2 then determines whether the number of pulses C1 totaled by the first distance counter is equal to or greater than a predetermined pulse number P1 (Step S2-4). In the present embodiment, the predetermined pulse number P1 is set as an appropriate number corresponding to the distance of movement of the vehicle in reverse, "200 mm". For example, immediately after the on-signal is input from the ignition switch 23, the pulse number C1 of the first distance counter is set to the initial value "0", and it is determined that the pulse number C1 has not reached the predetermined pulse number P1 (Step S2-4=NO), and the routine goes to Step S3-1.

When the parking operation has started and the vehicle C has moved 200 mm in reverse, the CPU 2 determines that the pulse number of C1 of the first distance counter is equal to or greater than the predetermined pulse number P1 (Step S2-4=YES). The CPU 2 then generates and stores new recorded image data 15 without using the recorded image data 15 stored during the last parking operation. The CPU 2 obtains the image data d from the camera 20 (Step S2-5). As described above, the CPU 2 extracts the abstract area 34 from the obtained image data G and generates the recorded image data 15.

The CPU 2 calculates the vehicle position by finding the relative coordinates for the initial position based on the speed pulse input from the speed sensor 21 (Step S2-6). Further, the CPU 2 attaches both the position data 16 representing the imaging position and the time data 17 to the generated recorded image data 15, and stores all this correlated-data in the image memory 7 (Step S2-7). The CPU 2 then resets the pulse number C1 of the first distance counter at the initial value "0" and the procedure goes to Step S3-1.

Figure 11:
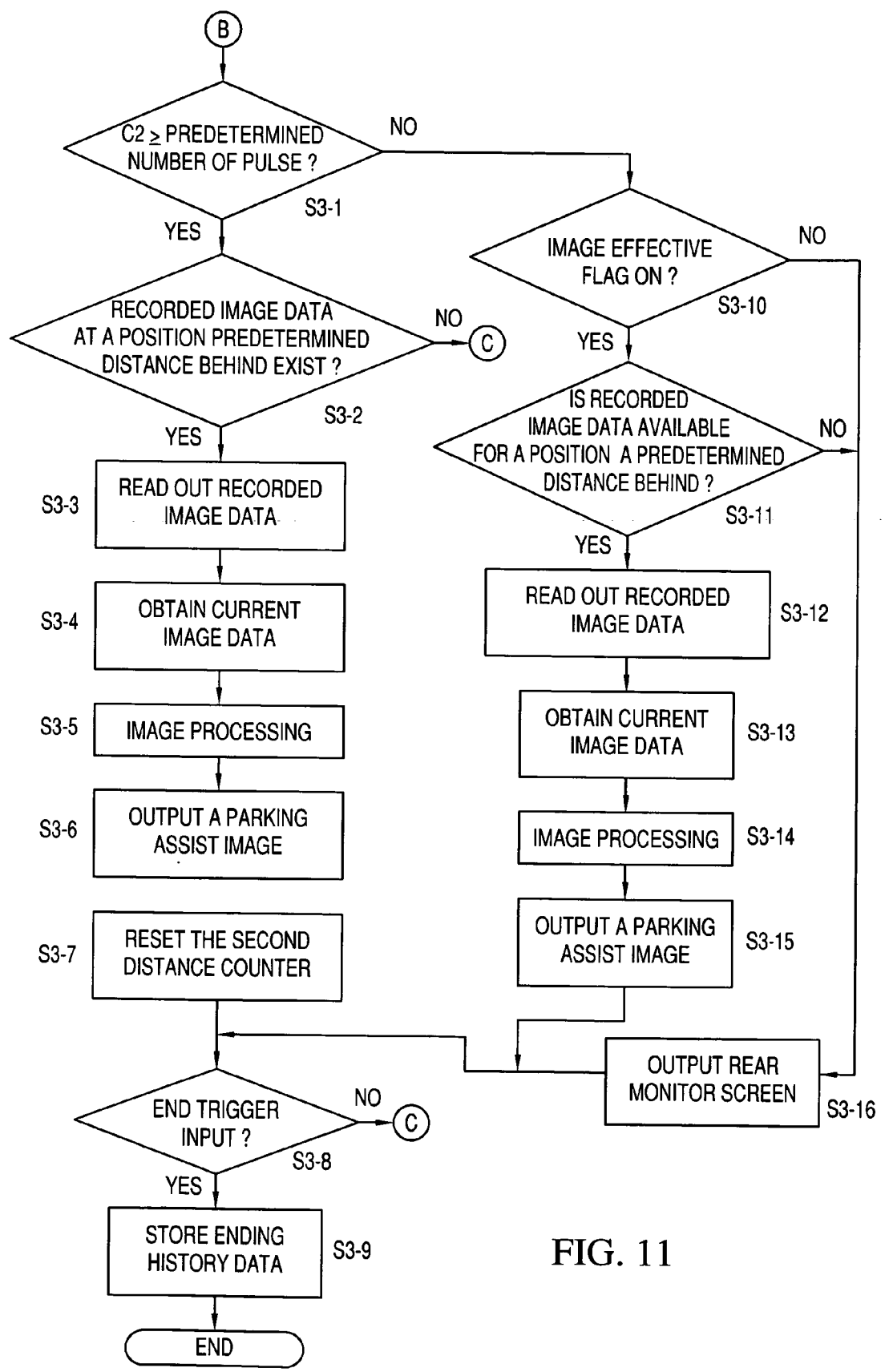
FIG. 11 is a flowchart of another routine in the method of the present invention.

As shown in FIG. 11, the CPU 2 determines whether the pulse number C2 of the second distance counter is a predetermined pulse number P2 (Step S3-1). In the present embodiment, the predetermined pulse number P2 is set as an appropriate number corresponding to the 200 mm reverse travel distance of the vehicle, as in the case of P1. Immediately after the on-signal is input from the ignition switch 23, the pulse number C2 of the second distance counter is set as the initial value "0".

When the pulse number C2 of the second distance counter is equal to or greater than the pulse number P2 (Step S3-1=YES), the CPU 2 determines whether the recorded image data 15, representing the position which is a predetermined distance behind the current position of the vehicle C in the direction of reverse movement, is stored in the image memory 7 (Step S3-2). In the present embodiment, the predetermined distance is set as a distance from the rear of the vehicle C to the wheel axis of the rear wheel CR, which is 800 mm.

When it is determined that there is no image data 15 related to the position which is a predetermined distance behind the current position (Step S3-2=NO), the routine returns to Step S2-3 and the recorded image data 15 is stored. When it is determined that there is in storage such image data 15 which was obtained at the position a predetermined distance behind the current position (Step S3-2=YES), the recorded image data 15 is read out (Step S3-3).

Next, the CPU 2 controls the camera 20 to obtain current image data 19 (Step S3-4). The image processor 8 executes image processing such as image correction of lens distortion of the camera 20 for the recorded current image data 19 obtained from the CPU 2 and the read out recorded image data 15 (Step S3-5). The image processing may be any image processing using known formulas.

Figure 7A:
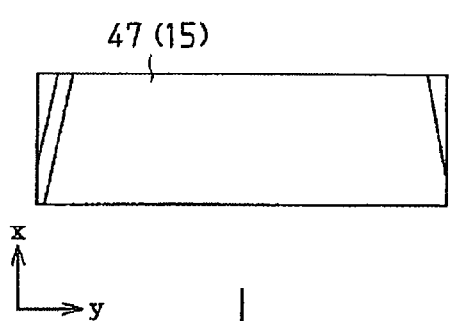
FIG. 7A is a diagram showing recorded image data.
Figure 7B:
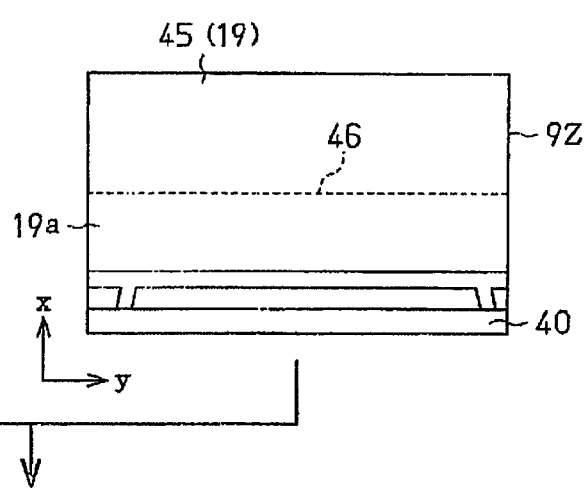
FIG. 7B is a diagram showing current image data.
Figure 7C:
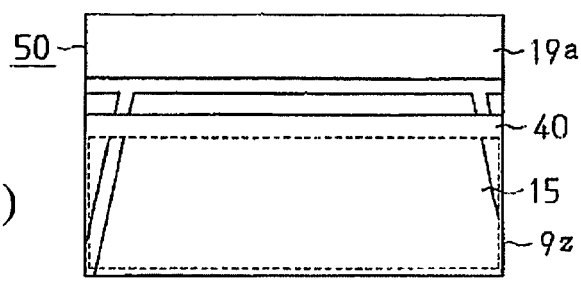
FIG. 7C is a diagram showing composite data.

Then the image processor 8 outputs the parking assist image, using both the current image data 19 and the recorded image data 15, after the image processing as described above (Step S3-6). More specifically, as shown in the image 45 of FIG. 7B, the image processor 8 abstracts the abstract area 46 set at the bottom of the display area 9z from the processed current image data 19 and generates composite abstract data 19a. Then as shown in FIG. 7C, the composite abstract data 19a is displayed at the-top of the display area 9z. Further as shown in the image 47 of FIG. 7A, the recorded image data 15 is displayed at the bottom of the display area 9z on the display 9. The recorded image data 15 is image data for the road surface beneath the rear of the vehicle C in its current position which corresponds to the area currently hidden as the blind spot of the camera 20. In this manner, the composite data 50 as shown in FIG. 7C is generated.

Figure 12:
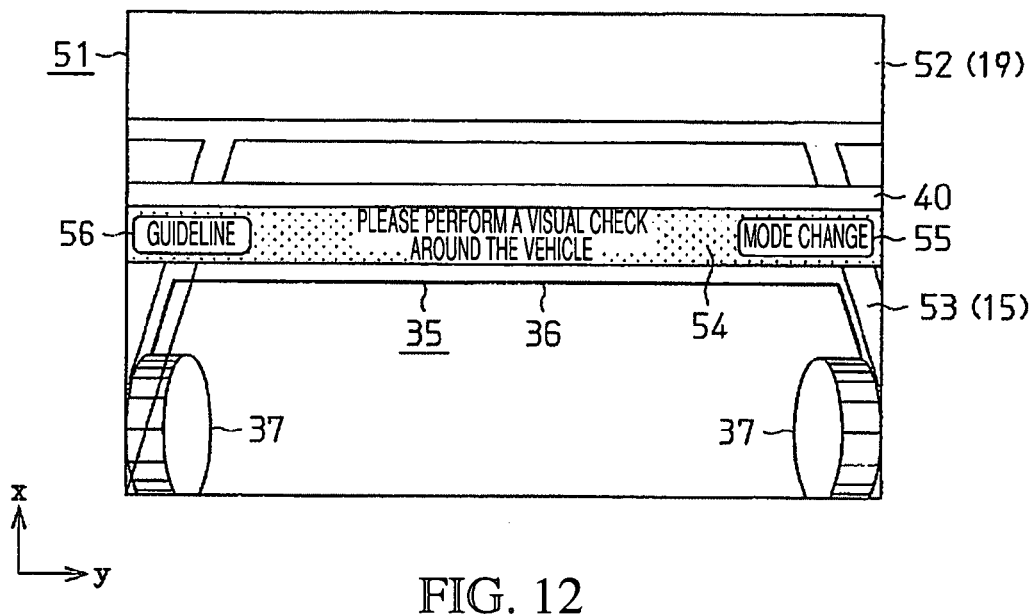
FIG. 12 is a diagram showing a parking assist image.
Figure 13:
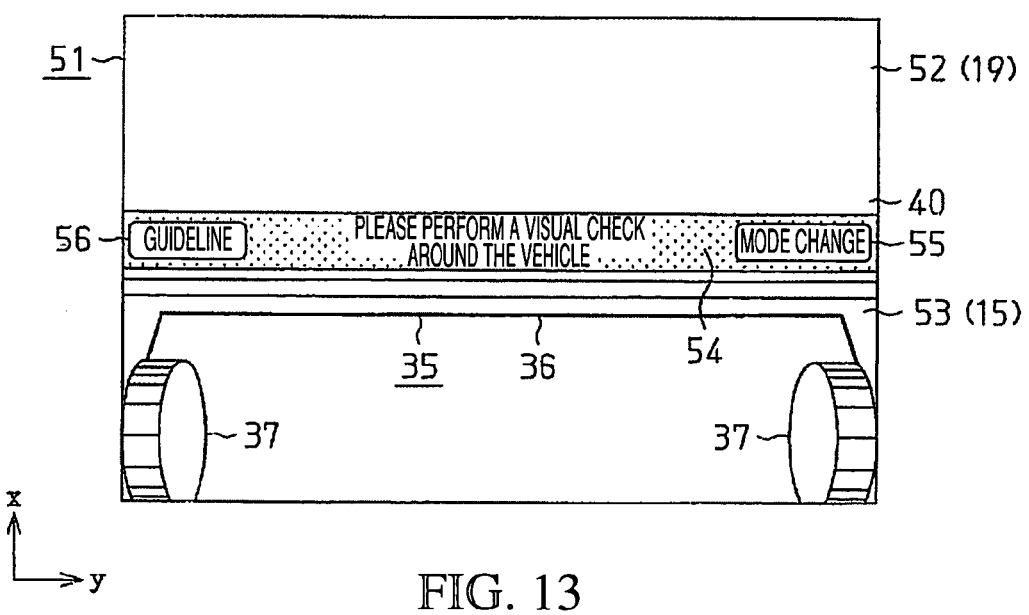
FIG. 13 is a diagram of another parking assist image.

The image processor 8 then converts the composite data 50 and various displays to image signals and outputs those signals as screens on the display 9. As a result, the parking assist image 51 in FIG. 12 is displayed. The parking assist image 51 includes the current image 52 based on the current image data 19 and the image revealing the area hidden as the blind spot 53 based on the recorded image data 15. In the current image 52, the area behind the current position of the vehicle C is displayed. The image revealing the area hidden as the blind spot 53 of the camera 20 is a display of that area beneath the vehicle C in its current position, extending from the rear bumper RB to the center point between the rear wheels CR.

The image processor 8 also generates a guidance display 54 in an area between the current image 52 and the image revealing the area hidden as the blind spot 53. The guidance display 54 not only serves to split the screen between the current image 52 and the image revealing the area hidden as the blind spot 53, but also displays a guide message urging a visual check around the vehicle. Further, the guidance display 54 includes an operating section 55 for changing the mode manually and an operating section 56 for superimposing a guideline 41 on the current image 52.

The image processor 8 superimposes an additional line 35, depending on the current position of the vehicle C relative to the image revealing the area hidden as the blind spot 53. Therefore, the driver of the vehicle may determine both the current position of the rear wheels CR relative to the parking space and the orientation of the vehicle within the parking space.

After displaying the parking assist image 51 in the display 9, the CPU 2 resets the pulse number C2 of the second distance counter to the initial value "0" (Step S3-7). Then the CPU 2 determines whether an end trigger has been input (Step S3-8). The end trigger is an off-signal from the ignition switch 23 which is operated by the driver. When the end trigger has not been input in Step S3-8, the routine returns to Step S2-3 and the steps described above are repeated. As a result, the recorded image data 15 is stored in the image memory 7 at each increment of movement of the vehicle in reverse the predetermined distance (200 mm in the present embodiment) and the parking assist image 51 is updated at each such point.

When the parking operation performed by the driver is terminated and the off-signal is input from the ignition switch 23 in Step S3-7, the CPU 2 determines that the end trigger has been input (Step S3-8=YES). After input of the end trigger, the CPU 2 stores the new ending history data 29 in the RAM 3 (Step S3-9). More specifically, the CPU 2 controls the camera 20 to obtain the image data G at the position where the end trigger is input. The CPU 2 further obtains the ending position data 27 representing the position where the parking operation of the vehicle C has been terminated and the ending time data 28 on the basis of the internal clock. The CPU 2 further temporarily stores the ending image data 26, the ending position data 27, and the ending time data 28 in correlation with each other as the ending history data 29 in the RAM 3. After that, the parking assist apparatus 1 enters the standby mode and waits for the input of the on-signal from the ignition switch 23. Although no screen is output, each set of recorded image data 15 remains stored in the image memory 7 without being deleted.

After the ignition switch 23 is turned off, the driver may check the parking position of the vehicle C and find that the vehicle is parked diagonally, that the distance between the vehicle C and the end of the parking space is too great or otherwise not acceptable, or that the space between the vehicle C and a neighboring vehicle is too narrow. In this case, the driver may re-activate the ignition switch 23 and repeat the parking operation. The CPU 2 determines that the on-signal has been input from the ignition switch 23 in Step S1-1, and further determines whether or not the shift position is "reverse" (Step S1-2). When it is determined that the shift position is "reverse" (Step S1-2=YES), the ending history data 29 stored in Step S3-9 is read out from the RAM 3 (Step S1-3).

Then in Step S1-4, the CPU 2 calculates the standby time based on the time data 17 in the ending history data 29 and the current time, and determines whether the standby time is within a predetermined time period (60 seconds). When the standby time is within 60 seconds (Step S1-4=YES), an image difference detection routine is executed (Step S1-5). More specifically, the image processor 8 compares the data for the current position of the vehicle C to the ending position data 27 and determines whether the current position is identical to the position where the last parking operation was terminated. Thus, there are two situations in which the driver may repeat the parking operation: in one situation the vehicle C is reversed from the same position where the last parking position was terminated; and the other situation is that in which the vehicle C is first moved forward and then steered and reversed to park. Therefore, when the vehicle C reverses from the last termination position, the image processor 8 reads out the ending image data 26 stored in the RAM 3. Then the image processor 8 generates difference data detailing the difference between the ending image data 26 as shown in the image 30 of FIG. 5A and the current image data 19 as shown in the image 31 of FIG. 5B, binarizes the difference data, and analyzes the similarities between the recorded image data 15 and the current image data 19.

In the scenario where the driver moves the vehicle C forward until the vehicle C is out of the parking space and then reverses the vehicle C, the image processor 8 compares the recorded image data 15 stored in the image memory 7 with the current image data 19. The image processor 8 searches for the recorded image data 15 which includes the position data 16 for the position where the shift position is changed to "reverse". If found, the image processor 8 reads out such recorded image data 15 from the image memory 7, moves the recorded image data 15 in a predetermined direction over the current image data 19 obtained at the current position of the vehicle C, and detects, for example, a position where the difference in pixel density becomes minimum as shown in the image 33 of FIG. 5D. Further, at the detected position, the image processor 8 generates difference data detailing the difference between the recorded image data 15 and the current image data 19, binarizes the difference data, and determines the similarity between the recorded image data 15 and the current image data 19.

When the difference is sufficiently small and the two sets of data have a high level of similarity, the CPU 2 determines that both the ending image data 26 (or the recorded image data 15) and the current image data 19 are obtained at almost the same position and that no movable body, such as another vehicle, is present behind the vehicle C. The CPU 2 then further determines that the ending image data 26 (or the recorded image data 15) and the current image data 19 are identical (Step S1-6=YES), and turns an effective image flag stored in the RAM 3 "ON" (Step S1-7). In Step S1-7, when the ending image data 26 (or the recorded image data 15) and the current image data 19 are not identical because, for example, an obstacle is present behind the vehicle C, when Step S1-7 is terminated, the routine goes to Step S2-1. When the parking operation is repeated, the distance through which the vehicle C has traveled in reverse is found to not have reached the predetermined distance (200 mm), so that the routine goes to Step S2-1.

After the CPU inputs the image data G and stores the recorded image data 15 captured at the initial position in the image memory 7 in Steps S2-1 and S2-2, the CPU 2 next determines whether the pulse number C1 of the first distance counter is equal to or greater than the predetermined pulse number P1 (Step S2-3). The first distance counter is set to the initial value "0" right after the on-signal is input from the ignition switch 23, so that the CPU 2 determines that the value "0" is less than the predetermined pulse number P1 (Step S2-3=NO) and the routine goes to Step S3-1.

The CPU 2 determines whether the pulse number C2 of the second distance counter is equal to or greater than the predetermined pulse number P2 in Step S3-1. The second distance counter is set to the initial value "0" right after the on-signal is input from the ignition switch 23 (Step S3-1=NO), so that the CPU 2 determines that the image effective flag is "ON" (Step S3-10). After a prolonged time interval following the termination of the parking operation, if the image effective flag is "OFF" (Step S3-10=NO), the CPU 2 obtains the image data G from the camera 20 and displays the rear monitor screen 38 on the display 9 (Step S3-16).

As described above, when the standby time following the termination of the parking operation is within the predetermined time period (60 seconds) and when the recorded image data 15 related to the current position is identical to the current image data 19, the image effective flag is "ON" (Step S3-10=YES). Therefore, the CPU 2 determines that the data comprising the recorded image data 15 stored before the termination of the parking operation in the image memory 7 is useful, and further determines whether the recorded image data 15 includes data related to the position which is a predetermined distance behind the current position of the vehicle C in accordance with the travel of the vehicle C in reverse (Step S3-11). If there is no such data included in the recorded image data 15 (Step S3-11=NO), the rear monitor screen 38 is displayed on the display 9 (Step S3-16).

Conversely, if such data 15 is found to be included in the recorded image data 15, the recorded image data 15 is read out (Step S3-12). In the present embodiment, the predetermined distance is the distance from the rear of the vehicle C to the rear wheel and is set as 800 mm. The CPU 2 controls the camera 20 and obtains the current image data 19 at the current position (the parking position) of the vehicle C (Step S3-13).

Through the CPU 2, the image processor 8 executes image processing such as correcting lens distortion of the camera 20 for the current image data 19 and the recorded image data 15 in the same manner as in Step S3-4 (Step S3-14). Then as described above, the composite data 50 including the current image data 19 and the recorded image data 15 is generated. The current image data 19 is displayed on the top of the display area 9z and the recorded image data 15 is displayed at the bottom of the display area 9z and together constitute the parking assist image 51 (Step S3-15). The displayed parking assist image 51 is similar to the image shown in FIG. 13. The parking assist image 51 includes the current image 52 on the top and the image revealing the area hidden as the blind spot 53 at the bottom, as in the parking assist image 51 in FIG. 12, and the guidance display 54 is interposed between the current image 52 and the image revealing the area hidden as the blind spot 53.

The driver may repeat the parking operation while referring to the parking assist image 51 for guidance. In this case, Step S2-3 to Step S2-8 are repeated until the end trigger is input, and the new recorded image data 15 is stored in the image memory 7 from Steps S3-1 to S3-6, or Step S3-1 and Steps S3-11 through S3-14 are repeated and the parking assist image 51 is updated. The driver may complete the parking operation with full knowledge of the position of the vehicle C and then turn the ignition switch 23 off. The CPU 2 determines that the end trigger is input in Step S3-8, stores the ending history data 29 in the RAM 3 for the next parking assist (Step S3-9), and the procedure is terminated.

The embodiment described above provides the user the following advantages.

1) According to the present invention, when the end trigger indicating the termination of the parking operation is input, the parking assist apparatus 1 stores the ending history data 29 which includes the ending image data 26, the ending position data 27, and the ending time data 28. Further, even after the parking operation has been terminated, the parking assist apparatus 1 maintains the data comprising the recorded image data 15 stored in the image memory 7 without deletion. When the driver repeats the parking operation, the apparatus determines the effectiveness of the recorded image data 15 stored before the termination of the parking operation, on the basis of the ending history data 29. Then if it is determined that the recorded image data 15 is useful, the parking assist image 51, comprising both the recorded image data 15 and the latest current image data 19, is displayed on the display 9. Therefore, even when the parking operation is repeated, the parking assist image 51 using the recorded image data 15 which was stored before the termination of the prior parking operation may be displayed, thus increasing convenience to the driver.

2) According to the present invention, when the ignition switch 23 is turned on, the CPU 2 of the parking assist apparatus 1 calculates the lapsed standby time of the parking assist apparatus 1 on the basis of the ending time data 28, in the ending history data 29 which is stored in the RAM 3 of the parking assist apparatus 1, and determines whether the standby time is within the predetermined time period (60 seconds). When the standby time is equal to or more than the predetermined time period, it is determined that the recorded image data 15 stored in the image memory 7 should not be used. Therefore, when there is a high possibility of a change in the area around the vehicle C, the driver can avoid using the recorded image data 15 stored before the termination of the prior parking operation. Meanwhile, when it is not likely that there has been a change in the area around the vehicle C, the recorded image data 15 stored in advance may be used. Therefore, the parking assist image 51 may be displayed when the parking operation is repeated only when there is little change in the area around the vehicle C.

3) According to the present invention, when the on-signal is input from the ignition switch 23, difference data detailing the difference between the current image data 19, which is obtained at the position where the shift position is changed to "reverse", and the ending image data 26 in the ending history data 29, is calculated and it is determined whether or not the current image data 19 is identical to the ending image data 26. Thus, when an obstacle is detected behind the vehicle C, the use of the recorded image data 15 stored in the image memory 7 may be avoided. Therefore, the appropriate parking assist image 51 may be displayed when the parking operation is repeated, while ensuring the security of the operation.

4) According to the present invention, when the off-signal is input from the ignition switch 23, the CPU 2 of the parking assist apparatus 1 determines that the parking operation is terminated. Therefore, the ending history data 29 may be stored in the RAM 3 without any manual operation by the driver.

The embodiments as described above may be modified as follows.

In the present invention, the recorded image data 15 may be correlated with both the position data 16 and the time data 17 in a table (not shown). The ending image data 26 may also be correlated with both the ending position data 27 and the ending time data 28 in a table (not shown).

In the above-described embodiments, the abstract area 34 is abstracted from the image data G and stored as the recorded image data 15. However, the image data G may be stored in the image memory 7 without being abstracted.

Figure 14:
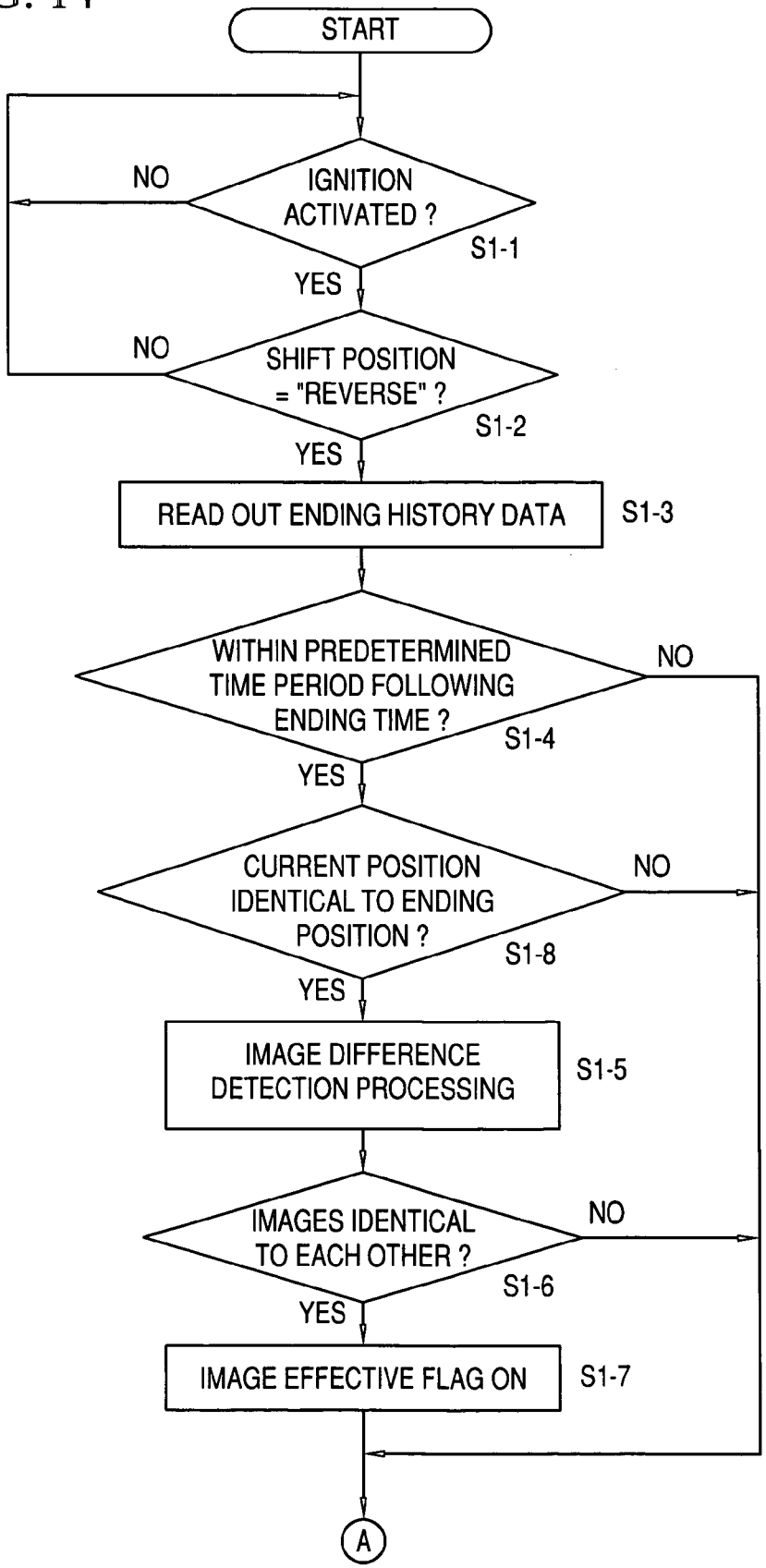
FIG. 14 is a flowchart of another embodiment of the method of the present invention.

In the above-described embodiments, the image effective flag may be turned "ON" only when the parking position, based on the ending history data 29 for the position where the parking operation was terminated, is identical to the current position of the vehicle C. As shown in FIG. 14, Steps S1-1 and S1-2 are executed and, when the ending history data 29 is read out from the RAM 3 (Step S1-3), it may be determined whether the position of the vehicle C at that time is identical to the position represented by the position data 16 in the ending history data 29 (Step S1-8). More specifically, if the vehicle C moves forward from the last parking position and repeats the parking operation starting from a new position, it is determined that the current position (the new position) of the vehicle C is not identical to the position represented by position data 16 in the ending history data 29. On the other hand, when it is determined that the current position is identical to that of the position data 16 in the ending history data 29 in Step S1-8, when the standby time is within the predetermined time period (Step S1-4=YES), and when the recorded image data 15 is identical to the current image data 19, the image effective flag is turned "ON" (Step S1-7). The image effective flag is not turned "ON" when the vehicle C has moved from the last parking position and the new parking operation is started from a new position, i.e. the image effective flag is turned "ON" only when the vehicle C starts in reverse (the parking operation is repeated) from the last parking position, so that the appropriate parking assist may be provided.

The recorded image data 15 may be stored at each predetermined time interval, rather than each increment of movement a predetermined distance.

The parking assist image 51 has been described as a combination of the current image 52 displayed at the top of the display area 9z and the image revealing the area hidden as the blind spot 53 displayed at the bottom of the display area 9z. However, the recorded image data 15 may be processed to change the view point or coordinates, and such data after image processing may be displayed as the parking assist image 51.

In the above-described embodiment the image revealing the area hidden as the blind spot 53 is a virtual image rear of the vehicle C and the area behind the vehicle C. However, instead, only the sides of the rear bumper of the vehicle C may be displayed in the image revealing the area hidden as the blind spot 53.

The parking assist apparatus 1 may include a GPS receiver. In this case, the CPU 2 may calculate the current position of the vehicle C on the basis of signals from the GPS receiver and the speed sensor 21. For example, when the vehicle C is transported by ferry, the wheels of the vehicle C do not rotate, so that the speed sensor 21 detects no rotation of the wheels or movement of the vehicle C. However, the GPS receiver may still detect the change in absolute position of the vehicle C.

In the above-described embodiment, when it is determined that the parking assist mode should be chosen, it is also determined whether or not the ending image data 26 (or the recorded image data 15) is identical to the current image 19. However, this latter determination may be skipped.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A parking assist method for assisting a parking operation of a vehicle, comprising:
    obtaining image data from an imaging device mounted on the vehicle;
    storing the obtained image data as recorded image data in image data storage means during and after termination of the parking operation;
    storing history data of the parking operation in history data storage means;
    determining whether or not the recorded image data stored before the termination of the parking operation is useful on the basis of the history data when the parking operation is repeated after the operation is terminated once; and
    outputting, provided that it is determined that the recorded image data is useful, a parking assist image using the recorded image data and current image data on display means.

2. A parking assist apparatus mounted in a vehicle, comprising:
    image obtaining means for obtaining image data from an imaging device mounted on the vehicle;
    image data storage means for storing the obtained image data as recorded image data;
    display control means for outputting a parking assist image using the recorded image data and latest recorded image data on display means;
    history data storage means for storing history data regarding a parking operation; and
    determining means for determining, when the parking operation is repeated after the operation is terminated once, whether the recorded image data stored before the termination of the prior parking operation is useful, based on the history data; wherein the display control means outputs, provided that it is determined that the recorded image data stored before the termination of the parking operation is useful, a parking assist image using the recorded image data and current image data on the display means.

3. The parking assist apparatus according to claim 2, wherein:
    the history data includes time data regarding the time when the prior parking operation was terminated; and
    the determining means determines, provided that the time lapsed since termination of the prior parking operation is within a predetermined time period on the basis of the time data and the time when the parking operation is repeated, that the recorded image data stored before the termination of the prior parking operation is useful.

4. The parking assist apparatus according to claim 2, wherein:
    the history data includes the image data obtained by the imaging device when the prior parking operation was terminated; and
    the determining means determines whether or not there is a change in the area around the vehicle by comparing the image data obtained at the termination of the prior parking operation with image data obtained when the parking operation is repeated, and if it is determined that there is no charge in the area around the vehicle, determines that the recorded image data stored before the termination of the prior parking operation is useful.

5. The parking assist apparatus according to claim 2, wherein:
    the history data is the recorded image data stored in the image data storage means during the prior parking operation; and
    the determining means determines whether or not there is a change in the area around the vehicle by comparing current image data obtained when the parking operation is to be repeated with the recorded image data previously obtained at the same position as the current position of the vehicle, and if the current image data and the recorded image data are determined to be the same, determines that the recorded image data stored before the termination of the prior parking operation is useful.

6. The parking assist apparatus according to claim 2, wherein:
    the history data includes the position of the vehicle when the prior-parking operation was terminated; and
    the determining means determines whether the position of the vehicle when the prior parking operation was terminated is identical to the position of the vehicle when the parking operation is to be repeated.

7. The parking assist apparatus according to claim 2, wherein:
    the parking assist apparatus further includes vehicle condition determining means for determining, responsive to an off-signal input from an ignition system of the vehicle, that a current parking operation is terminated.

8. The parking assist apparatus according to claim 3, wherein:
    the parking assist apparatus further includes vehicle condition determining means for determining, responsive to an off-signal input from an ignition system of the vehicle, that a current parking operation is terminated.

9. The parking assist apparatus according to claim 4, wherein:
    the parking assist apparatus further includes vehicle condition determining means for determining, responsive to an off-signal input from an ignition system of the vehicle, that a current parking operation is terminated.

10. The parking assist apparatus according to claim 5, wherein:
    the parking assist apparatus further includes vehicle condition determining means for determining, responsive to an off-signal input from an ignition system of the vehicle, that a current parking operation is terminated.

11. The parking assist apparatus according to claim 6, wherein:
    the parking assist apparatus further includes vehicle condition determining means for determining, responsive to an off-signal input from an ignition system of the vehicle, that a current parking operation is terminated.

* * * * *